(12) United States Patent
Zhou et al.

(10) Patent No.: US 11,615,513 B2
(45) Date of Patent: Mar. 28, 2023

(54) CONTROL DISPLAY METHOD AND ELECTRONIC DEVICE

(71) Applicant: HUAWEI TECHNOLOGIES CO., LTD., Guangdong (CN)

(72) Inventors: Xuan Zhou, Shenzhen (CN); Chunliang Liu, Shanghai (CN); Yubo Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 183 days.

(21) Appl. No.: 17/041,984

(22) PCT Filed: Apr. 17, 2018

(86) PCT No.: PCT/CN2018/083442
§ 371 (c)(1),
(2) Date: Sep. 25, 2020

(87) PCT Pub. No.: WO2019/184017
PCT Pub. Date: Oct. 3, 2019

(65) Prior Publication Data
US 2021/0090224 A1    Mar. 25, 2021

(30) Foreign Application Priority Data
Mar. 28, 2018    (CN) .......................... 201810266983.1

(51) Int. Cl.
*G06T 5/00*    (2006.01)
*G06T 5/40*    (2006.01)
(Continued)

(52) U.S. Cl.
CPC .............. *G06T 5/009* (2013.01); *G06T 5/40* (2013.01); *G06T 5/50* (2013.01); *H04N 9/643* (2013.01); *H04N 9/646* (2013.01)

(58) Field of Classification Search
CPC ... G06K 9/00; G06T 5/40; G06T 2207/10024; G06T 5/008; G06T 7/194; G06T 7/11; H04N 9/643; H04N 9/646; H04N 5/272
See application file for complete search history.

(56) References Cited

U.S. PATENT DOCUMENTS 8,847,973 B2    9/2014    Calandrino et al.
8,860,749 B1*   10/2014   Ainslie ................... G09G 5/14
                                                     345/589

(Continued)

FOREIGN PATENT DOCUMENTS

CN    104076928 A    10/2014
CN    104778047 A    7/2015
(Continued)

*Primary Examiner* — Li Liu
(74) *Attorney, Agent, or Firm* — Womble Bond Dickinson (US) LLP

(57) ABSTRACT

This application provides a control display method and an electronic device. The method includes: determining a display position of a control on a background picture; and then determining a display scene of the background picture at the display position of the control, where the display scene of the background picture at the display position of the control is determined based on display parameters of the background picture at the display position of the control; determining display parameters of the control based on the display scene of the background picture at the display position of the control, so that a contrast between the background picture displayed at the display position of the control and the control displayed based on the display parameters meets a first preset condition; and displaying the control based on the determined display parameters of the control. This application is applicable to control display of the electronic device.

12 Claims, 7 Drawing Sheets

(51) Int. Cl.
    *G06T 5/50*           (2006.01)
    *H04N 9/64*         (2023.01)

(56) References Cited

U.S. PATENT DOCUMENTS

| | | | | |
|---|---|---|---|---|
| 2006/0109488 A1* | 5/2006 | Park | ............ | G06F 3/1205 |
| | | | | 358/1.1 |
| 2012/0154420 A1* | 6/2012 | Calandrino | ............ | G09G 5/02 |
| | | | | 345/589 |
| 2014/0002506 A1* | 1/2014 | Li | ............ | G06T 11/001 |
| | | | | 345/666 |
| 2015/0205505 A1 | 7/2015 | Conn et al. | | |
| 2016/0041957 A1* | 2/2016 | Finsterwald | ............ | G06Q 10/10 |
| | | | | 715/202 |
| 2016/0065864 A1* | 3/2016 | Guissin | ............ | G06T 5/008 |
| | | | | 348/239 |
| 2017/0281053 A1* | 10/2017 | Kelarakis | ............ | A61B 5/117 |
| 2018/0018937 A1 | 1/2018 | Yu et al. | | |

FOREIGN PATENT DOCUMENTS

| | | |
|---|---|---|
| CN | 104978186 A | 10/2015 |
| CN | 105812888 A | 7/2016 |
| WO | 2016184206 A1 | 11/2016 |

\* cited by examiner

CONTROL DISPLAY METHOD AND ELECTRONIC DEVICE

This application claims priority to Chinese Patent Application No. 201810266983.1, filed with the Chinese National Intellectual Property Administration on Mar. 28, 2018 and entitled "CONTROL DISPLAY METHOD AND ELECTRONIC DEVICE", which is incorporated herein by reference in its entirety.

TECHNICAL FIELD

This application relates to the field of image processing technologies, and in particular, to a control display method and an electronic device.

BACKGROUND

With development of communications technologies, especially popularization of electronic devices such as mobile phones, a user not only has more requirements on functions of the electronic device, but also has higher requirements on a presentation effect of a display screen of the electronic device. Using the mobile phone as an example, currently, the mobile phone may allow the user to change a background picture on a display screen, or automatically update a background picture according to a specific time rule based on a preference of the user, or the like. The background picture includes but is not limited to a picture selected by the user from pictures locally stored in the mobile phone, or a picture obtained by the user from a third-party device such as a server by using the mobile phone in a communication manner such as an internet access manner.

A home screen of the mobile phone is used as an example. A display screen presented on the home screen usually displays a control used to present content such as time and date to the user. To ensure that the control can be clearly presented against different background pictures, currently, when the mobile phone presents a background picture, as shown in FIG. 1, a black gradient mask may be added to the left background picture, and the control is displayed in white on the mask, so as to obtain the right display screen. This allows the control to be in sharp contrast to the background picture with the added black gradient mask. When the control is displayed in this manner, a large black area exists on the background picture, which affects the appearance, and in particular, for a background picture with bright colors or light colors, the presence of the black gradient mask is very abrupt.

SUMMARY

Embodiments of this application provide a control display method and an electronic device, so that a control can be clearly displayed on different background pictures.

To achieve the foregoing objective, the following technical solutions are used in the embodiments of this application.

According to a first aspect, an embodiment of this application provides a control display method. The method includes: determining a display position of a control on a background picture; and then determining a display scene of the background picture at the display position of the control, where the display scene of the background picture at the display position of the control is determined based on display parameters of the background picture at the display position of the control; determining display parameters of the control based on the display scene of the background picture at the display position of the control, so that a contrast between the background picture displayed at the display position of the control and the control displayed based on the display parameters meets a first preset condition; and displaying the control based on the determined display parameters of the control.

A display effect of the control is determined based on the display scene of the background picture at the display position of the control, and the display scene is determined based on the display parameters of the background picture. Therefore, the display parameters of the background picture at the display position of the control may affect the display effect of the control. In this way, it can be ensured that a contrast between the display effect of the control and a display effect of the background picture at the display position of the control meets the first preset condition. For an electronic device, a presentation effect of the control displayed on the background picture may be adjusted as the background picture changes. In particular, for a background picture that is changed periodically or aperiodically, the display effect of the control can be adapted to the background picture before and after changing, to ensure that the control is clearly displayed.

In an embodiment, the first preset condition may indicate that the display effect of the control is distinct from the display effect of the background picture at the display position of the control, or a better color transition can be implemented between the control and the background picture when it is ensured that the control is visible and clear.

It can be learned that, in this embodiment of this application, the display parameters corresponding to the control are determined by analyzing the background picture in the region in which the control is located, so that the contrast between displaying of the control and the background picture of the control is maintained. When the background picture changes, the control can automatically change accordingly, and the contrast between the control and the background picture is always maintained, so that the control is always easy for the user to recognize, and convenient for the user to search for information, thereby improving interaction efficiency. In addition, the control is friendly to a visually impaired user or a user with color discrimination disorder, which can increase intelligence of the electronic device. In addition, according to this solution, keeping displaying of the background picture unchanged, and only changing a display color of the control can make displaying of the control friendly to a user, so that user experience is improved, and interaction efficiency is improved.

In an embodiment, the display parameters include a hue value, a saturation value, and a value.

In an embodiment, the display scene includes at least one of a black-and-white scene, a monochromatic color scene, a color scene with a dominant color, and a scene without a dominant color. To implement a better transition between the display effect of the control and the display effect of the background picture, in this embodiment of this application, the display effect of the control may be determined based on the display scene of the background picture, to provide a better visual effect for the user when the control is clearly displayed.

In an embodiment, the determining a display scene of the background picture at the display position of the control may be implemented as: determining that the display scene is the black-and-white scene when a quantity of pixels, whose saturation values are less than a first threshold, in the background picture at the display position of the control is greater than a first quantity.

In an embodiment, the first threshold may be a human-eye black-and-white perception threshold. The first quantity may be a preset quantity of black-and-white pixels. A condition that the black-and-white scene meets may be that in the control region, a quantity of pixels whose S values are less than the human-eye black-and-white perception threshold is greater than the preset quantity of black-and-white pixels.

In the embodiments of this application, the condition that the black-and-white scene meets may be Count (S<S_th) >W×L×bs, where S is used to represent, in the control region, the pixels whose S values are less than the human-eye black-and-white perception threshold; S_th is used to represent the human-eye black-and-white perception threshold for the S value; bs is used to represent a threshold of a ratio of black-and-white pixels to pixels in the control region; and W×L×bs is used to indicate the preset quantity of black-and-white pixels in the control region. The human-eye black-and-white perception threshold may be used to distinguish whether a pixel viewed by the user is a black-and-white pixel or a color pixel. A determining manner may be: if an S value of a pixel is less than S_th, the pixel is considered as a black-and-white pixel, or if the S value of the pixel is greater than or equal to S_th, the pixel is considered as a color pixel.

In an embodiment, the determining a display scene of the background picture at the display position of the control may be implemented as: determining that the display scene is the monochromatic color scene when the quantity of pixels, whose saturation is less than the first threshold, in the background picture at the display position of the control is less than or equal to the first quantity, and a total quantity of pixels included in an interval with a largest quantity of pixels in a hue statistical histogram of the background picture at the display position of the control is greater than a second quantity.

In an embodiment, the second quantity may be a preset quantity of pixels in a dominant color in the monochromatic color scene. A condition of the monochromatic color scene may be Count (S<S_th)<W×L×bs, and after Nh is sorted in descending order, Nh (0)>W×L×bh1, where bs1 is used to indicate a threshold of a ratio of the pixels in the dominant color in the monochromatic color scene to pixels in the control region, and W×L×bs1 is used to indicate the preset quantity of pixels in the dominant color in the monochromatic color scene in the control region.

In an embodiment, the determining a display scene of the background picture at the display position of the control may be implemented as: determining that the display scene is the color scene with a dominant color when the total quantity of pixels included in the interval with the largest quantity of pixels in the hue statistical histogram of the background picture at the display position of the control is greater than a third quantity.

In an embodiment, the third quantity may be a preset quantity of pixels in the dominant color in the color scene with a dominant color. A condition that the color scene with a dominant color meets may be that the total quantity of pixels included in the interval with the largest quantity of pixels in the hue statistical histogram is greater than the preset quantity of pixels in the dominant color in the color scene with a dominant color.

In the embodiments of this application, after Nh is sorted in descending order, Nh (0)>W×L×bh2, where bs1 is used to indicate a threshold of a ratio of the pixels in the dominant color in the color scene with a dominant color to pixels in the control region, and W×L×bh2 is used to indicate the preset quantity of pixels in the dominant color in the color scene with a dominant color in the control region.

In an embodiment, the determining a display scene of the background picture at the display position of the control may be implemented as: when the background picture at the display position of the control meets a second preset condition, determining that a scene of the control region is the scene without a dominant color.

In an embodiment, the second preset condition includes at least one of the following: the quantity of pixels, whose saturation is less than the first threshold, in the background picture at the display position of the control is less than or equal to the first quantity, and the total quantity of pixels included in the interval with the largest quantity of pixels in the hue statistical histogram of the background picture at the display position of the control is less than or equal to the second quantity; and the total quantity of pixels included in the interval with the largest quantity of pixels in the hue statistical histogram of the background picture at the display position of the control is less than or equal to the third quantity.

In an embodiment, the display parameters of the control include a saturation value of a dominant color of the control, a value of the dominant color of the control, and a hue value of the dominant color of the control.

In an embodiment, when the scene is the black-and-white scene, the determining display parameters of the control based on the display scene of the background picture at the display position of the control may be implemented as: determining that the saturation value of the dominant color of the control is 0, and the hue value of the dominant color of the control is any value in an available value range, where the available value range includes integers from 0 to 360; and when a maximum value of the background picture at the display position of the control is greater than a second threshold, determining that the value of the dominant color of the control is a difference between the maximum value and a third threshold; or when the maximum value of the background picture at the display position of the control is less than or equal to the second threshold, determining that the value of the dominant color of the control is 100. The maximum value may be represented by a maximum value Max (Nv). The second threshold may be represented by a value threshold Tv. The third threshold may be a value recognition capability interval.

In an embodiment, when the scene is the monochromatic color scene or the color scene with a dominant color, the determining display parameters of the control based on the display scene of the background picture at the display position of the control may be implemented as: determining that the hue value of the dominant color of the control is an average hue value of the interval with the largest quantity of pixels in the hue statistical histogram of the background picture at the display position of the control; determining that the saturation value of the dominant color of the control is an average saturation value of an interval with a largest quantity of pixels in a saturation statistical histogram of the background picture at the display position of the control; and when a maximum value of the background picture at the display position of the control is greater than a second threshold, determining that the value of the dominant color of the control is a difference between the maximum value and a third threshold; or when the maximum value of the background picture at the display position of the control is less than or equal to the second threshold, determining that the value of the dominant color of the control is 100.

In an embodiment, when the scene is the scene without a dominant color, the determining display parameters of the control based on the display scene of the background picture at the display position of the control may be implemented as: determining that the saturation value of the dominant color of the control is 0, and the hue value of the dominant color of the control is any value in the available value range, where the available value range includes integers from 0 to 360; and when the maximum value of the background picture at the display position of the control is greater than the second threshold, determining that the value of the dominant color of the control is 0; or when the maximum value of the background picture at the display position of the control is less than or equal to the second threshold, determining that the value value of the dominant color of the control is 100.

In an implementation, the display parameters of the control further include a saturation value of an auxiliary color of the control, a value of the auxiliary color of the control, and a hue value of the auxiliary color of the control.

In an embodiment, when the scene is the color scene with a dominant color, after the saturation value of the dominant color of the control, the value of the dominant color of the control, and the hue value of the dominant color of the control are determined, the method further includes: determining that the hue value of the auxiliary color of the control is an average hue value of an interval with a largest quantity of pixels other than the interval with the largest quantity of pixels in the hue statistical histogram of the background picture at the display position of the control; determining that the saturation value of the auxiliary color of the control is the average saturation value of the interval with the largest quantity of pixels in the saturation statistical histogram of the background picture at the display position of the control; and when the maximum value of the background picture at the display position of the control is greater than the second threshold, determining that the value of the auxiliary color of the control is the difference between the maximum value and the third threshold; or when the maximum value value of the background picture at the display position of the control is less than or equal to the second threshold, determining that the value of the auxiliary color of the control is 100.

In an implementation, the display parameters further include at least one of a dominant color shadow of the control and a dominant color highlight of the control.

In an embodiment, a saturation value of the dominant color shadow of the control is the saturation value of the dominant color of the control plus 30, a value of the dominant color shadow of the control is 30, and a hue value of the dominant color shadow of the control is the same as the hue value of the dominant color of the control.

In an embodiment, a saturation value of the dominant color highlight of the control is the saturation value of the dominant color of the control minus 30, a value of the dominant color highlight of the control is 100, and a hue value of the dominant color highlight of the control is the same as the hue value of the dominant color of the control.

In an embodiment, the display parameters further include at least one of an auxiliary color shadow of the control and an auxiliary color highlight of the control.

In an embodiment, the black-and-white scene and the scene without a dominant color are used as an example. After Nv is sorted in descending order, an intermediate value of an interval corresponding to Nv (0) is selected, and an auxiliary color is determined based on a value relationship between the intermediate value and the value threshold.

When the intermediate value is greater than the value threshold, the auxiliary color of the control is set to black, or when the intermediate value is less than or equal to the value threshold, the auxiliary color of the control is set to white. In the embodiments of this application, the auxiliary color shadow is black, and the auxiliary color highlight is white.

Using the monochromatic color scene as an example, after Nh is sorted in descending order, an intermediate value of an interval corresponding to Nh (0) is selected, and an auxiliary color is determined based on a relationship between the intermediate value and a preset hue interval. When the intermediate value belongs to the preset hue interval, the auxiliary color of the control is set to black, or when the intermediate value does not belong to the preset hue interval, the auxiliary color of the control is set to white. In the embodiments of this application, the auxiliary color shadow is black, and the auxiliary color highlight is white.

Using the color scene with a dominant color as an example, based on the determined dominant color and the determined auxiliary color, the dominant color shadow, the dominant color highlight, the auxiliary color shadow, and the auxiliary color highlight are derived. It should be noted that, for the color scene with a dominant color, a manner of deriving the auxiliary color shadow and the auxiliary color highlight is the same as a manner of deriving the dominant color shadow and the dominant color highlight based on the dominant color. Details are not described herein.

It can be learned that the electronic device may use the derived dominant color shadow, dominant color highlight, auxiliary color shadow, and auxiliary color highlight to increase a three-dimensional effect for the control, provide more differentiated control information presentation, and further facilitate user interaction.

According to a second aspect, an embodiment of this application provides an electronic device. A structure of the electronic device includes a display, a memory, one or more processors, a plurality of application programs, and one or more programs, where the one or more programs are stored in the memory, and when the one or more processors execute the one or more programs, the electronic device is enabled to implement the method according to any one of the first aspect and the implementations of the first aspect.

According to a third aspect, an embodiment of this application provides a readable storage medium, including an instruction. When the instruction runs on an electronic device, the electronic device is enabled to perform the method according to any one of the first aspect and the implementations of the first aspect.

According to a fourth aspect, an embodiment of this application provides a computer program product, where the computer program product includes software code, and the software code is used to perform the method according to any one of the first aspect and the implementations of the first aspect.

According to a fifth aspect, an embodiment of this application provides a graphical user interface, configured to perform the method according to any one of the first aspect and the implementations of the first aspect.

DESCRIPTION OF EMBODIMENTS

Figure 1:
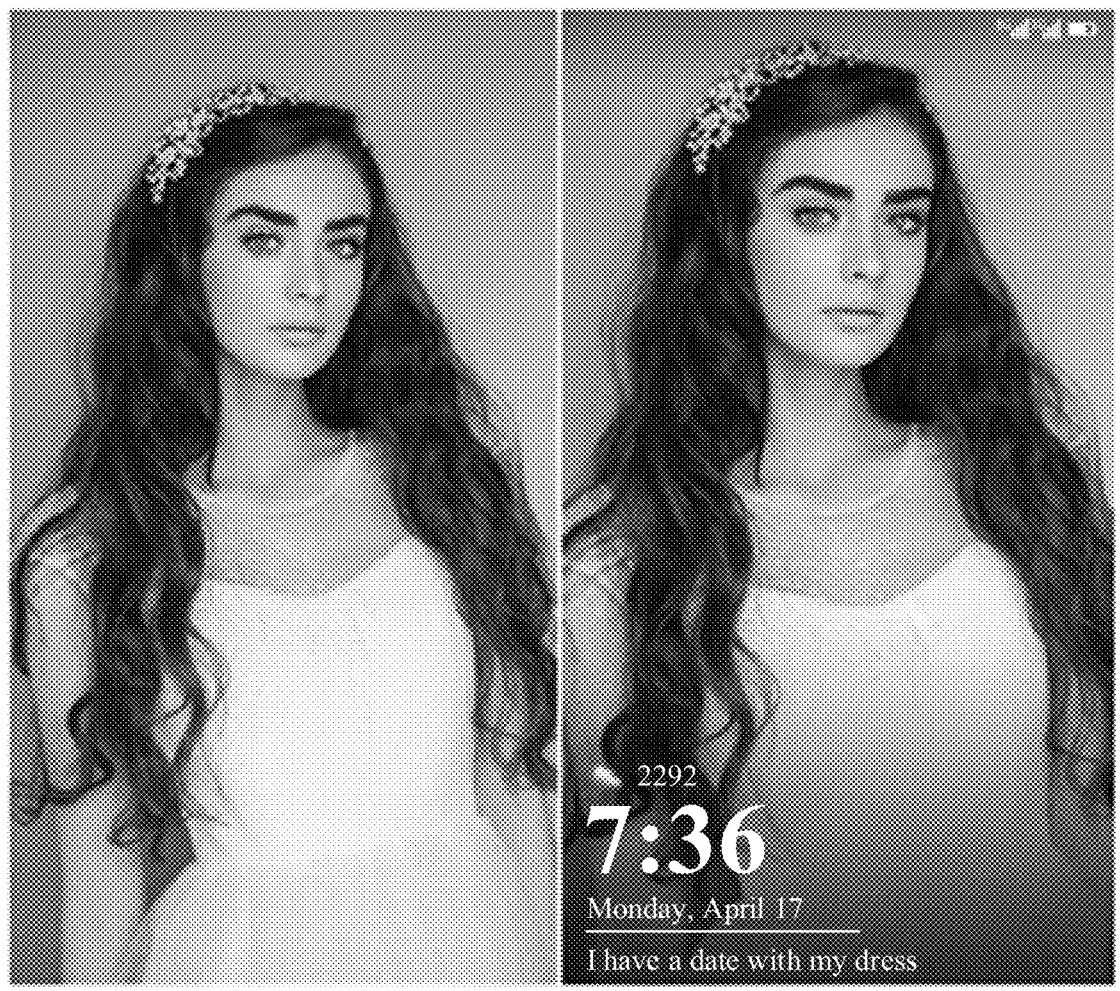
FIG. 1 is a schematic diagram of a display screen according to the prior art.
Figure 2:
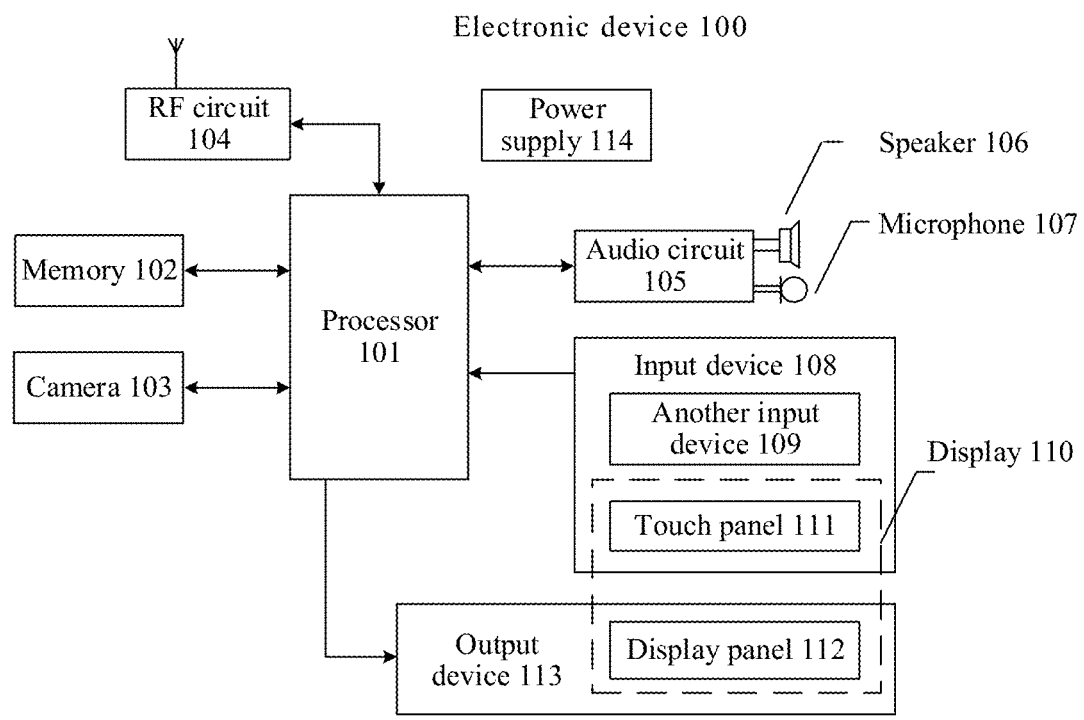
FIG. 2 is a schematic structural diagram of a first electronic device according to an embodiment of this application.

The embodiments of this application may be applied to an electronic device. The electronic device may include a device such as a notebook computer, a smartphone, a virtual reality (VR) device, an augmented reality (AR), a vehicle-mounted device, or an intelligent wearable device. The electronic device may be provided with at least a display, an input device, and a processor. An electronic device 100 is used as an example. As shown in FIG. 2, the electronic device 100 includes components such as a processor 101, a memory 102, a camera 103, an RF circuit 104, an audio circuit 105, a speaker 106, a microphone 107, an input device 108, another input device 109, a display 110, a touch panel 111, a display panel 112, an output device 113, and a power supply 114. The display 110 includes at least the touch panel 111 serving as an input device and the display panel 112 serving as an output device. It should be noted that a structure of the electronic device shown in FIG. 2 constitutes no limitation on the electronic device, and the electronic device may include more or fewer components than those shown in the figure, or combine some components, or split some components, or have different component arrangements. This is not limited herein.

The following describes the components of the electronic device 100 in detail with reference to FIG. 2.

The Radio Frequency (RF) circuit 104 may be configured to: send and/or receive information or receive and send a signal during a call. For example, if the electronic device 100 is a mobile phone, the electronic device 100 may send, by using the RF circuit 104 after receiving downlink information sent by a base station, the downlink information to the processor 101 for processing, and send related uplink data to the base station. The RF circuit usually includes but is not limited to an antenna, at least one amplifier, a transceiver, a coupler, a Low Noise Amplifier (LNA), a duplexer, and the like. In addition, the RF circuit 104 may further communicate with a network and another device through wireless communication. The wireless communication may use any communications standard or protocol, including but not limited to Global System for Mobile communications (GSM), General Packet Radio Service (GPRS), Code Division Multiple Access (CDMA), Wideband Code Division Multiple Access (WCDMA), Long Term Evolution (LTE), an email, a Short Message Service (SMS), and the like.

The memory 102 may be configured to store a software program and a module. The processor 101 runs the software program and the module that are stored in the memory 102, to execute various function applications of the electronic device 100 and process data. The memory 102 may mainly include a program storage area and a data storage area. The program storage area may store an operating system, an application program required by at least one function (for example, a sound playing function or an image playing function), and the like. The data storage area may store data (for example, audio data or video data) created when the electronic device 100 is used, and the like. In addition, the memory 102 may include a high-speed random access memory, or may include a non-volatile memory, such as at least one magnetic disk storage device, a flash storage device, or another volatile solid-state storage device.

The another input device 109 may be configured to: receive entered digital or character information, and generate key signal input related to user settings and function control of the electronic device 100. Specifically, the another input device 109 may include but is not limited to one or more of a physical keyboard, a function key (such as a volume control key or an on/off key), a tracking ball, a mouse, a joystick, an optical mouse (the optical mouse is a touch-sensitive surface that does not display visual output, or an extension of a touch-sensitive surface formed by a touchscreen), and the like. The another input device 109 may further include a sensor built in the electronic device 100, such as a gravity sensor or an acceleration sensor, and the electronic device 100 may further use a parameter detected by the sensor as input data.

The display 110 may be configured to display information entered by a user or information provided for the user, and various menus of the electronic device 100, and may further receive a user input. In addition, the display panel 112 may be configured in a form of a liquid crystal display (LCD), an organic light-emitting diode (OLED), or the like. The touch panel 111, also referred to as a touchscreen, a touch-sensitive screen, or the like, may collect a touch or non-touch operation (for example, an operation performed by the user on the touch panel 111 or near the touch panel 111 by using any proper object or accessory, such as a finger or a stylus, or a motion sensing operation may be included, and the operation includes an operation type such as a single-point control operation or a multipoint control operation) performed by the user on or near the touch panel 111, and drive a corresponding connection apparatus based on a preset program. It should be noted that the touch panel 111 may further include two parts: a touch detection apparatus and a touch controller. The touch detection apparatus detects a touch orientation and gesture of the user, detects a signal brought by the touch operation, and sends the signal to the touch controller. The touch controller receives touch information from the touch detection apparatus, converts the touch information into information that can be processed by the processor 101, and then sends the information to the processor 101. In addition, the touch controller can further receive and execute a command sent by the processor 101. In addition, the touch panel 111 may be implemented in a plurality of types, such as a resistive type, a capacitive type, an infrared ray, and a surface acoustic wave, or the touch panel 111 may be implemented by using any technology developed in the future. Generally, the touch panel 111 may cover the display panel 112. The user may perform, based on content displayed on the display panel 112 (the displayed content includes but is not limited to a soft keyboard, a virtual mouse, a virtual key, an icon, and the like), an operation on or near the touch panel 111 that covers the display panel 112. After detecting the operation on or near the touch panel 111, the touch panel 111 sends the operation to the processor 101 to determine the user input, and then the processor 101 provides corresponding visual output on the display panel 112 based on the user input. In FIG. 2, the touch panel 111 and the display panel 112 are used as two independent components to implement input and output functions of the electronic device 100. However, in some embodiments, the touch panel 111 and the display panel 112 may be integrated to implement the input and output functions of the electronic device 100.

The RF circuit 104, the speaker 106, and the microphone 107 may provide an audio interface between the user and the electronic device 100. The audio circuit 105 may transmit, to the speaker 106, a signal converted from received audio data, and the speaker 106 converts the signal into a sound signal for outputting. In addition, the microphone 107 may convert a collected sound signal into a signal. The audio circuit 105 receives the signal, converts the signal into audio data, and then outputs the audio data to the RF circuit 104, to send the audio data to, for example, another electronic device, or outputs the audio data to the memory 102, so that the processor 101 performs further processing based on content stored in the memory 102. In addition, the camera 103 may collect an image frame in real time and send the image frame to the processor 101 for processing, and store a processed result in the memory 102 and/or display the processed result to the user by using the display panel 112.

The processor 101 is a control center of the electronic device 100 and is connected to each part of the entire electronic device 100 by using various interfaces and lines, and performs, by running or executing the software program and/or the module stored in the memory 102 and invoking the data stored in the memory 102, various functions of the electronic device 100 and data processing, so as to perform overall monitoring on the electronic device 100. It should be noted that the processor 101 may include one or more processing units. The processor 101 may further integrate an application processor and a modem processor. The application processor mainly processes an operating system, a user interface (UI), an application program, and the like. The modem processor mainly processes wireless communication. It may be understood that the modem processor may alternatively not be integrated into the processor 101.

The electronic device 100 may further include the power supply 114 (for example, a battery) that supplies power to each component. In this embodiment of this application, the power supply 114 may be logically connected to the processor 101 by using a power management system, to manage functions such as charging, discharging, and power consumption by using the power management system.

In addition, a component not shown in FIG. 2 also exists. For example, the electronic device 100 may further include a Bluetooth module, and details are not described herein.

The following describes the technical solutions provided in the embodiments of this application by using an example in which the electronic device 100 is a mobile phone.

After the mobile phone determines a background picture, the mobile phone may determine, based on a position of a control on a display screen during display, a region in which the control is located on the background picture, that is, a display position of the control on the background picture, or a control region, or the like. This is not limited herein. Then, the mobile phone determines a display scene corresponding to the background picture at the display position of the control based on HSV values of each pixel of the background picture in the control region, and determines, with reference to the display scene corresponding to the background picture, a presentation mode of the control, that is, display parameters used for displaying the control.

In this application, a display region of the control may be further refined. For example, the display region is displayed at a granularity of a display character. Alternatively, whether a preset condition is met is determined, for example, whether the display region of the control is greater than the preset condition (an area, a width, a quantity of rows, or a quantity of pixels is greater than a preset value), or whether a quantity of display characters is greater than a preset value, or the like, and if the preset condition is met, the display region is refined based on a preset rule. For example, each display row or each display column is used as one display region, or each character is used as one display region. The display region may be alternatively refined based on an attribute (for example, display time data, weather data, motion data, body data, or notification data) of to-be-displayed content in the display region, and display content with different attributes is divided into different display regions. Specifically, for example, a time and weather control, as one control, needs to be displayed on a screen. Displayed content includes time data and weather data. The time data may include year, month, day, morning, afternoon, and a specific time. The weather data may include real-time weather and temperature, sunrise and sunset time, humidity, a pollution degree, and the like. A display region of the time and weather control on the background picture may be a region occupied for displaying all content of the control, or may be formed by two independent regions: a time data region and a weather region. Each region may be further divided into smaller regions. For example, "year, month, and day" is in a region, the specific time, for example, 7:36 a.m., is in a region, sunny/cloudy/rain is in a region, the humidity is in a region, and the pollution degree is in a region. Each region is independently applicable to the solutions in the embodiments of this application. In addition, a granularity of division of a display region may be greater than a control. For example, several controls are combined as a whole, or a part of one or more controls and a part or all of another or more controls are combined as a whole, and the whole is used as the display region. The foregoing region division is merely an example, and various division methods may be refined or combined based on a specific requirement, for example, a screen size, an amount of displayed content, a user habit/requirement, or the like. The granularity of the display region may be one control, a part of content in one control, or may be greater than one control. The display region may be determined by default at delivery, or may be set/changed by a user.

In the embodiments of this application, the background picture includes but is not limited to an image, a moving image, or the like that is used as an alternative wallpaper, and an image, a moving image, or the like that has been used as a wallpaper, for example, a picture presented on a lock screen of the mobile phone, a frame of image in a moving image presented on the lock screen of the mobile phone, a picture presented on a home screen of the mobile phone, or a frame of image in a moving image presented on the home screen of the mobile phone. In the embodiments of this application, the background picture may further include a picture, a frame of image in a moving image, a frame of image in a video, or the like that can be edited or shared in an album or a folder, and a preview image and the like generated when the mobile phone shoots an image, a video, and the like. It should be noted that, such content stored locally in the mobile phone or cached locally in the mobile phone may also be an image, a moving image, or the like used as the foregoing alternative wallpaper.

The control includes (but is not limited to) content displayed on the background picture. For example, the control may be a control corresponding to a function provided by a mobile phone system, and a control such as a name or an icon of an application program. This is not limited herein. This application is mainly applicable to a character control displayed on a background picture, for example, a character or a character string such as a text, a letter, or a number, or may be used for other non-character controls such as a picture and an icon. Specifically, this application may be applied to a system-level screen, for example, a home screen or a HiBoard, or may be applied to a screen of a specific application, for example, a chat screen of social/shopping software or a browsing screen of reading software. A display manner of the control on the background picture includes but is not limited to floating display, overlay display, and the like. This is not limited herein. Floating display means that a layer at which the control is located is above a layer at which the background picture is located. Overlay display includes but is not limited to that the control and the background picture are located at a same layer, and content originally displayed in the background picture at the display position of the control is replaced with the control. It should be noted that the control may be displayed at a fixed position on the background picture, where the fixed position means that a position of the control does not change unless the user adjusts the display position of the control.

In the embodiments of this application, the control refers to content that can be displayed on the display screen. For the control corresponding to the function provided by the foregoing mobile phone system, as long as a device manufacturer opens an interface standard to a third-party control provider, the control can be displayed on the display screen. In addition, a presentation position of the background picture includes the home screen of the mobile phone or a display screen that can display the background picture, such as the HiBoard. For example, when a task such as music or a movie that is displayed on the HiBoard is displayed, content such as a text, a picture, or another character may be displayed in the background picture, and the content may be used as one of the foregoing controls.

A scene refers to a type that is determined based on HSV values of pixels in a background picture at a control region for different control regions and that is used to reflect color distribution of the background picture corresponding to the control region, where H refers to hue, S refers to purity (or referred to as saturation), and V refers to value. In the embodiments of this application, the scene may include but is not limited to a black-and-white scene, a monochromatic color scene, and a color scene with a dominant color. In the embodiments of this application, a scene that does not belong to any one of the foregoing scenes may be considered as a scene without a dominant color.

The presentation mode includes but is not limited to a dominant color, or a dominant color and an auxiliary color presented when the control is displayed on the background picture. For the dominant color, a dominant color shadow and a dominant color highlight may be derived. Similarly, for the auxiliary color, an auxiliary color shadow and an auxiliary color highlight may also be derived. In the embodiments of this application, one control may include different types and/or sizes of fonts. For example, the control that is on the lock screen and that is used to prompt the user for time includes a date and a specific time. In the embodiments of this application, to improve a visual effect for the user, in addition to displaying the date and the specific time differently by using the different types and/or sizes of fonts, the date and the specific time may be displayed differently in different presentation modes. For example, the date is displayed in a dominant color, and the specific time is displayed in an auxiliary color. To make a presentation effect more stereoscopic, the mobile phone may use the derived dominant color shadow, dominant color highlight, auxiliary color shadow, and auxiliary color highlight to improve a stereoscopic effect for the control. For a specific presentation mode, refer to an implementation in the prior art. This is not limited herein.

The following describes an implementation provided in an embodiment of this application by using a single control region as an example.

When the background picture is changed, a region in which the control needs to be overlaid on a changed background picture, that is, the control region mentioned above, namely the display position of the control may be determined (or a previous determined result may be directly obtained). In the embodiments of this application, a width of the control region may be represented by W, and a length of the control region may be represented by L. The control region may be represented as a W×L region. A quantity of pixels in a real scene may be calculated based on an actual situation. In the embodiments of this application, for ease of description, a quantity of pixels in the control region is simply set to W×L. Both W and L are integers greater than 0.

The mobile phone may obtain, from each application program, a control region in which a control corresponding to each application program is located. For example, for a control used to prompt the user for time, the mobile phone may determine, from a time application program, a control region corresponding to the control.

After determining the control region, the mobile phone may convert a color of a background picture corresponding to the control region from RGB to HSV. Each of the W×L pixels in the background picture corresponding to the control region may be represented by an HSV value. A value of H ranges from 0 to 360 (including 0 and 360), and a value of S and a value of V range from 0 to 100 (including 0 and 100). To be specific, after color conversion, each pixel may be represented by using an H value, an S value, and a V value, that is, an HSV value of the pixel. In the embodiments of this application, the color of the background picture corresponding to the control region may be converted from RGB to HSV in a conversion manner in the prior art, for example, using a pixel matrix. Details are not described herein.

After color conversion, the background picture in the control region is analyzed based on the HSV value of each pixel in the background picture corresponding to the control region. In the embodiments of this application, statistics collection may be performed on distribution of each pixel in the H value, the S value, and the V value by using a statistical histogram. It should be noted that, in addition to the statistical histogram, another manner that can collect statistics on distribution of HSV values of a plurality of pixels may be used. This is not limited herein.

In an embodiment of this application, hue statistical histograms of $360/X_h$ intervals are generated by using $X_h$ as a span. To be specific, a first interval is from 0 to $X_h$ (including 0 and $X_h$), a second interval is from $X_h+1$ to $2X_h$ (including $X_h+1$ and $2X_h$), and a third interval is from $2X_h+1$ to $3X_h$ (including $2X_h+1$ and $3X_h$). By analogy, the $360/X_h$ intervals are obtained. Herein, $X_h$ may be measured by using an angle, in other words, a unit of $X_h$ is degree. Then, all pixels are classified based on H values of all the pixels, to obtain quantities of pixels belonging to different intervals. Herein, $X_h$ is usually set to a number by which 360 is divisible, for example, 10, 12, or 36. In this way, it can be ensured that ranges of all the intervals are the same, so as to increase precision in a pixel statistics collection process. In an embodiment of this application, $N_h$ (i) may be used to represent a quantity of pixels in each interval obtained through statistics collection, where i is an integer greater than or equal to 0, and a maximum value of i is a quantity of the foregoing intervals, namely, $360/X_h$. After statistics collection on the quantity of pixels in each interval is completed, the quantities of pixels in all the intervals are sorted, for example, sorted in ascending order of the quantities of pixels or sorted in descending order of the quantities of pixels. In addition, for ease of statistics collection, $N_h$ (0) may represent a quantity of pixels corresponding to a histogram with a largest quantity of pixels, and $N_h$ (1) may represent a quantity of pixels corresponding to a histogram with a second largest quantity of pixels. By analogy, a quantity of pixels corresponding to each histogram is obtained, in other words, quantities of pixels corresponding to the $360/X_h$ histograms are obtained.

Pixels are counted in one histogram. The histograms are selected in descending order of the quantities of pixels, in other words, the histograms are selected in the order of the quantities of pixels such as $N_h$ (0), $N_h$ (1), $N_h$ ($360/X_h$), so that one or more histograms with a quantity of pixels greater than 50% of all pixels in all the histograms are selected from all the histograms, and then a hue corresponding to each selected histogram is used as the dominant color of the control region. Considering that the histogram corresponds to a hue interval, in other words, the first interval, the second interval, or the like, to determine a hue corresponding to each selected histogram, using a single histogram as an example, an intermediate value of a hue interval corresponding to the single histogram may be used as a hue corresponding to the single histogram. For example, if the selected histogram includes a histogram corresponding to the first interval, because an upper limit value of the first interval is $X_h$ and a lower limit value of the first interval is 0, an intermediate value of the first interval is $(0+X_h)/2=X_h/2$, in other words, a hue value corresponding to the histogram corresponding to the first interval is $X_h/2$. Similarly, a hue corresponding to each selected histogram may be determined. It can be learned that when a value of $X_h$ is relatively large, a quantity of intervals is relatively small, and a quantity of pixels in each interval is usually relatively large, which affects precision of determining the dominant color of the control region. Alternatively, when a value of $X_h$ is relatively small, a quantity of intervals is relatively large, and a quantity of pixels in each interval is usually relatively small. In this case, it is difficult to find a hue distribution rule of each pixel, and it is difficult to accurately select the dominant color of the control region.

Saturation statistical histograms of $100/X_s$ intervals are generated by using $X_s$ as a span. To be specific, a first interval is from 0 to $X_s$ (including 0 and $X_s$), a second interval is from $X_s+1$ to $2X_s$ (including $X_s+1$ and $2X_s$), and a third interval is from $2X_s+1$ to $3X_s$ (including $2X_s+1$ and $3X_s$). By analogy, the $100/X_s$ intervals are obtained. Herein, $X_s$ may be expressed by using a percentage. For example, if $X_s=1$, it may be determined that a saturation is 1%. In the embodiments of this application, for ease of description, the saturation mentioned in the entire document is represented by a positive integer ranging from 1 to 100, to replace a saturation value in a form of percentage. Then, all pixels are classified based on S values of all the pixels, to obtain quantities of pixels belonging to different intervals. Herein, $X_s$ is usually set to a number by which 100 is divisible, for example, 10, 20, or 25. In this way, it can be ensured that ranges of all the intervals are the same, so as to increase precision in a pixel statistics collection process. In this embodiment of this application, $N_s$ (j) may be used to represent a quantity of pixels in each interval obtained through statistics collection, where j is an integer greater than or equal to 0, and a maximum value of j is a quantity of the foregoing intervals, namely, $100/X_s$. After statistics collection on the quantity of pixels in each interval is completed, the quantities of pixels in all the intervals are sorted, for example, sorted in ascending order of the quantities of pixels or sorted in descending order of the quantities of pixels. In addition, for ease of statistics collection, $N_s$ (0) may represent a quantity of pixels corresponding to a histogram with a largest quantity of pixels, and $N_s$ (1) may represent a quantity of pixels corresponding to a histogram with a second largest quantity of pixels. By analogy, a quantity of pixels corresponding to each histogram is obtained, in other words, quantities of pixels corresponding to the $100/X_s$ histograms are obtained.

Similar to the saturation statistical histogram, value statistical histograms of $100/X_v$ intervals are generated by using $X_v$ as a span. To be specific, a first interval is from 0 to $X_v$ (including 0 and $X_v$), a second interval is from $X_v+1$ to $2X_v$ (including $X_v+1$ and $2X_v$), and a third interval is from $2X_v+1$ to $3X_v$ (including $2X_v+1$ and $3X_v$). By analogy, the $100/X_v$ intervals are obtained. Herein, $X_v$ may be expressed by using a percentage. For example, if $X_v=100$, it may be determined that a value is 100%. In the embodiments of this application, for ease of description, the value mentioned in the entire document is represented by a positive integer ranging from 1 to 100, to replace a value in a form of percentage. Then, all pixels are classified based on V values of all the pixels, to obtain quantities of pixels belonging to different intervals. Herein, $X_v$ is usually set to a number by which 100 is divisible, for example, 10, 20, or 25. In this way, it can be ensured that ranges of all the intervals are the same, so as to increase precision in a pixel statistics collection process. In this embodiment of this application, $N_v$ (k) may be used to represent a quantity of pixels in each interval obtained through statistics collection, where k is an integer greater than or equal to 0, and a maximum value of k is a quantity of the foregoing intervals, namely, 100/Xv. After statistics collection on the quantity of pixels in each interval is completed, the quantities of pixels in all the intervals are sorted, for example, sorted in ascending order of the quantities of pixels or sorted in descending order of the quantities of pixels. In addition, for ease of statistics collection, Nv (0) may represent a quantity of pixels corresponding to a histogram with a largest quantity of pixels, and Nv (1) may represent a quantity of pixels corresponding to a histogram with a second largest quantity of pixels. By analogy, a quantity of pixels corresponding to each histogram is obtained, in other words, quantities of pixels corresponding to the 100/Xv histograms are obtained.

Display scenes of a background picture corresponding to a control region are distinguished based on the foregoing statistical result. In the embodiments of this application, a condition corresponding to each of the black-and-white scene, the monochromatic color scene, and the color scene with a dominant color may be predefined. After the control region meets the foregoing condition, a scene corresponding to the control region may be determined. When the foregoing condition is not met, a display scene of the background picture corresponding to the control region may be determined as the scene without a dominant color.

Figure 3A:
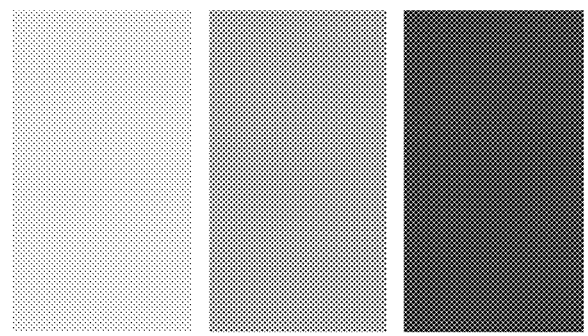
FIG. 3(a) is a schematic diagram of a black-and-white scene according to an embodiment of this application.

For example, FIG. 3(a) is a schematic diagram of three example black-and-white scenes. The condition that the black-and-white scene meets may be that in the control region, a quantity of pixels whose S values are less than a human-eye black-and-white perception threshold is greater than a preset quantity of black-and-white pixels. In the embodiments of this application, the condition that the black-and-white scene meets may be Count (S<S_th)>W×L×bs, where S is used to represent, in the control region, the pixels whose S values are less than the human-eye black-and-white perception threshold; S_th is used to represent the human-eye black-and-white perception threshold for the S value; bs is used to represent a threshold of a ratio of black-and-white pixels to pixels in the control region; and W×L×bs is used to indicate the preset quantity of black-and-white pixels in the control region. The human-eye black-and-white perception threshold may be used to distinguish whether a pixel viewed by the user is a black-and-white pixel or a color pixel. A determining manner may be: if an S value of a pixel is less than S_th, the pixel is considered as a black-and-white pixel, or if the S value of the pixel is greater than or equal to S_th, the pixel is considered as a color pixel.

In the embodiments of this application, bs is a value that is less than 1 and greater than 0 such as a fraction, a decimal, or a percentage, and may be usually a value greater than or equal to 90%. In other words, for the black-and-white scene, although pixels distributed in the control region are mainly black-and-white pixels, there may be a small quantity of color pixels. However, existence of the small quantity of color pixels does not affect the fact that the control region is the black-and-white scene. Herein, S_th is a value greater than 0 and less than 100, and usually may be 3 to 5. For a user with color weakness, S_th may be set to about 10.

Figure 3B:
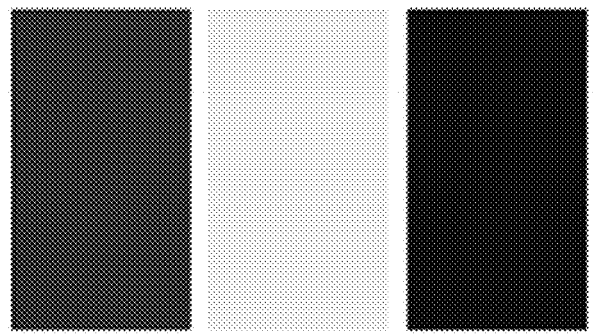
FIG. 3(b) is a schematic diagram of a monochromatic color scene according to an embodiment of this application.

For another example, considering that a pixel whose saturation is 0 is black, white, or gray, in other words, a pixel whose S value is 0 presents black, white, or gray, in this embodiment of this application, it can be ensured that saturation of each pixel in the monochromatic color scene is not 0. In addition, because the monochromatic color scene includes one color, it may be considered that HSV values of all pixels in the control region are the same. FIG. 3(b) is a schematic diagram of three example monochromatic color scenes. Colors are red, yellow, and blue from left to right.

Considering that there may be a small quantity of pixels of another color in the monochromatic color scene, and because there is a relatively low ratio of the quantity of pixels of another color to a quantity of all pixels in the control region, the pixels of another color may be ignored, and a scene of the control region is determined as the monochromatic color scene. In an embodiment, the condition that the monochromatic color scene meets may be that, in the control region, a quantity of pixels whose S values are less than or equal to the human-eye black-and-white perception threshold is greater than the preset quantity of black-and-white pixels, and the total quantity of pixels included in the interval with the largest quantity of pixels in the hue statistical histogram is greater than a preset quantity of pixels in the dominant color in the monochromatic color scene.

In the embodiments of this application, the condition of the monochromatic color scene may be Count (S<S_th)<W×L×bs, and after Nh is sorted in descending order, Nh (0)>W×L×bh1, where bs1 is used to indicate a threshold of a ratio of the pixels in the dominant color in the monochromatic color scene to pixels in the control region, and W×L×bs1 is used to indicate the preset quantity of pixels in the dominant color in the monochromatic color scene in the control region.

It should be noted that bh1 is similar to bs, is a value less than 1 and greater than 0 such as a fraction, a decimal, or a percentage, and may be usually a value greater than or equal to 95%. In other words, for the monochromatic color scene, although pixels distributed in the control region are mainly pixels with a same HSV value, there may be a small quantity of color pixels with different HSV values. However, existence of the small quantity of color pixels with different HSV values does not affect the fact that the control region is the monochromatic color scene. Usually, the value of bs1 is greater than the value of bs.

Figure 3C:
FIG. 3(c) is a schematic diagram of a color scene with a dominant color according to an embodiment of this application.

For another example, FIG. 3(c) is a schematic diagram of three example color scenes with dominant colors. The condition that the color scene with a dominant color meets may be that the total quantity of pixels included in the interval with the largest quantity of pixels in the hue statistical histogram is greater than a preset quantity of pixels in the dominant color in the color scene with a dominant color. In the embodiments of this application, after Nh is sorted in descending order, Nh (0)>W×L×bh2, where bs1 is used to indicate a threshold of a ratio of the pixels in the dominant color in the color scene with a dominant color to pixels in the control region, and W×L×bh2 is used to indicate the preset quantity of pixels in the dominant color in the color scene with a dominant color in the control region.

It should be noted that bh2 is similar to bs and bh1, is a value less than 1 and greater than 0 such as a fraction, a decimal, or a percentage, and may be usually a value greater than or equal to 60%. Usually, the value of bh2 is less than the value of bh1.

Figure 3D:
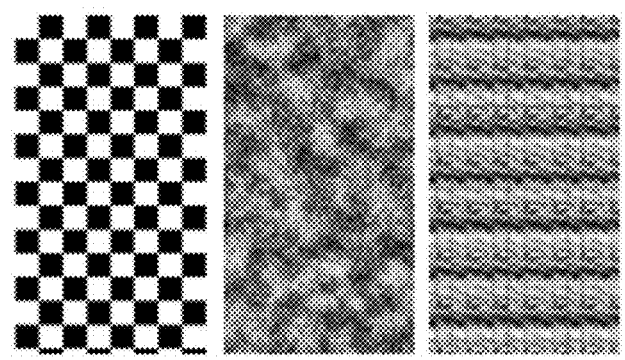
FIG. 3(d) is a schematic diagram of a scene without a dominant color according to an embodiment of this application.

In addition, in the embodiments of this application, with reference to the conditions of the foregoing scenes, for a control region that does not meet the condition of any one of the foregoing scenes, the control region belongs to the scene without a dominant color. For example, FIG. 3(d) is a schematic diagram of three example color scenes without dominant colors.

With reference to the foregoing result of distinguishing the scenes corresponding to the control region, a dominant color of the control is determined for different scenes.

For example, after it is determined that a scene corresponding to the control region is the black-and-white scene, considering that most pixels in all pixels in the control region of the black-and-white scene are black, white, or gray, in this embodiment of this application, to ensure consistency of a viewing effect of the user, the color of the control is black, white, or gray. In other words, saturation of the dominant color of the control is 0, that is, an S value of the dominant color is 0. In this embodiment of this application, based on a statistical result of the value statistical histogram, a value range including the largest quantity of pixels, that is, an upper limit and a lower limit of a value interval may be determined. For example, when the value interval is the third interval of the value statistical histogram, an upper limit of the value interval is 3Xv, and a lower limit is 2Xv+1, in this embodiment of this application, it may be considered that a value of a maximum value Max (Nv) is (3Xv+2Xv+1)/2, that is, (5Xv+1)/2. When the value of the maximum value is greater than a value threshold, a value of the control is set to a difference between the maximum value and a value recognition capability interval. When the value of the maximum value is less than or equal to the value threshold, a value of the dominant color of the control is set to a relatively large value. For example, the value of the dominant color of the control is set to 100. Considering that when an S value of the dominant color is 0 and the V value is determined, a value of the hue does not significantly affect a color presented to the user by the dominant color, in this embodiment of this application, the value of the hue, that is, an H value of the dominant color, is any value from 0 to 360.

The value threshold may be preset by the user, and a function of the value threshold is to determine lightness presented in the entire control region, so that the mobile phone selects a brighter color as a dominant color of the control when a color of the control region is relatively dark, or likewise, selects a darker color as the dominant color of the control when the color of the control region is relatively bright, so that the control presents better than the control region. The value recognition capability interval may be preset by the user, and a value of the value recognition capability interval is usually a value that can be used by human eyes to recognize a difference between brightness and darkness.

In an embodiment of this application, for the black-and-white scene, the saturation value of the dominant color of the control is set to 0, the hue value of the dominant color is any available value, and the value of the dominant color is determined based on a relationship between the maximum value and the value threshold. When the maximum value Max (Nv)>Tv, the value of the dominant color is set to Max (Nv)−Dv, or when Max (Nv)≤Tv, the value of the dominant color is set to 100. Tv is used to indicate the value threshold, and a value of Tv may be 70. Dv is used to indicate the value recognition capability interval, and a value of Dv may range from 30 to 40. It should be noted that values of Tv and Dv include but are not limited to the foregoing examples, and may be further adjusted with reference to a user's capability of recognizing a color or an empirical value. A setting manner, a specified value, and the like are not limited herein.

For another example, after it is determined that a scene corresponding to the control region is the monochromatic color scene, the hue of the dominant color of the control is an H value corresponding to a single color in the monochromatic color scene, in other words, after Nh is sorted in descending order, Nh (0) corresponds to an intermediate value of a hue interval. For example, if an interval corresponding to Nh (0) is the first interval in the hue statistical histogram, the intermediate value, that is, the value of H, is Xh/2. The saturation of the dominant color is an intermediate value of a saturation interval corresponding to Ns (0) after Ns is sorted in descending order. A manner of determining the value of the dominant color is the same as the manner of determining the value of the dominant color in the black-and-white scene. For details, refer to the determining manner provided in the black-and-white scene. Details are not described herein.

For another example, after it is determined that the scene corresponding to the control region is the color scene with a dominant color, the hue of the dominant color of the control is an intermediate value of a hue interval corresponding to Nh (0) and an intermediate value of a hue interval corresponding to Nh (1) after Nh is sorted in descending order, that is, the largest and second largest hue values. The largest hue value may be considered as the hue of the dominant color, and the second largest hue value may be considered as the hue of the auxiliary color. A manner of determining the saturation of the dominant color, the value of the dominant color, the saturation of the auxiliary color, and the value of the auxiliary color is the same as a manner of determining the saturation of the dominant color and the value of the dominant color in the monochromatic color scene. For details, refer to the foregoing descriptions. Details are not described herein.

For another example, after it is determined that a scene corresponding to the control region is the scene without a dominant color, the hue of the dominant color of the control is set to any available value, and the saturation may be set to 0. When the maximum value in the control region Max (Nv)>Tv, the value of the dominant color of the control is set to 0. If the maximum value in the control region Max (Nv)≤Tv, the value of the dominant color of the control is set to 100. To ensure clarity of the displayed control in the scene without a dominant color, in this embodiment of this application, a mask needs to be further added under the control to set off the control.

According to an embodiment of this application, the display parameters corresponding to the control are determined by analyzing the background picture in the region in which the control is located, so that the contrast between displaying of the control and the background picture of the control is maintained. When the background picture displayed at the display position of the control changes, the control can automatically change accordingly, and the contrast between the control and the background picture of the control is always maintained, so that the control is always easy for the user to recognize, and convenient for the user to search for information, thereby improving interaction efficiency. In addition, the control is friendly to a visually impaired user or a user with color discrimination disorder, which can increase intelligence of the electronic device. In addition, according to this solution, keeping displaying of the background picture unchanged, and only changing the display effect of the control can make displaying of the control friendly to the user, so that user experience is improved, and interaction efficiency is improved.

After the dominant color of the control is determined or the dominant color and the auxiliary color of the control are determined, the dominant color shadow, the dominant color highlight, the auxiliary color shadow, and the auxiliary color highlight may be determined for the different scenes. For a case in which an auxiliary color is not determined, it may be determined, based on the scene, that the auxiliary color is black or white based on an intermediate value corresponding to Nv (0) or Nh (0), and then an auxiliary color shadow and an auxiliary color highlight are determined.

In an embodiment of this application, it may be set that an S value of the dominant color shadow increases by 30 compared with an S value of the dominant color, a V value of the dominant color shadow is 30, and an H value of the dominant color shadow is the same as a hue value of the dominant color. It may be set that an S value of the dominant color highlight decreases by 30 compared with the S value of the dominant color, a V value the dominant color highlight is 100, and an H value of the dominant color highlight is the same as the hue value of the dominant color. It should be noted that an increase or a decrease of the S value may be 30 or a value close to 30. This is not limited herein. In addition, after the S value of the dominant color increases by 30 or decreases by 30, the S value exceeds the value range of S. In this case, when the S value of the dominant color increases by 30, the S value of the dominant color shadow may be set to 100; when the S value of the dominant color decreases by 30, the S value of the dominant color highlight may be set to 0. However, it should be noted that the foregoing example in which the value exceeds the range after increasing or decreasing by 30 usually does not occur, and therefore this case usually does not occur.

The black-and-white scene and the scene without a dominant color are used as an example. After Nv is sorted in descending order, an intermediate value of an interval corresponding to Nv (0) is selected, and an auxiliary color is determined based on a value relationship between the intermediate value and the value threshold. When the intermediate value is greater than the value threshold, the auxiliary color of the control is set to black, or when the intermediate value is less than or equal to the value threshold, the auxiliary color of the control is set to white. In the embodiments of this application, the auxiliary color shadow is black, and the auxiliary color highlight is white.

Figure 4A:
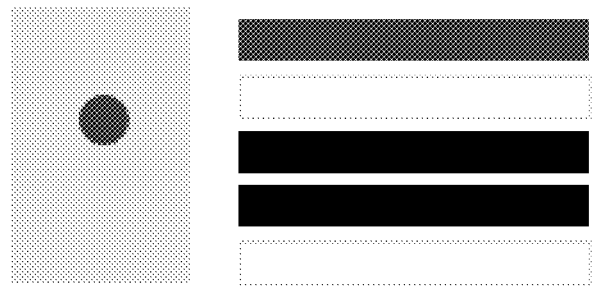
FIG. 4(a) is a schematic diagram of a color that can be presented by a control provided in a gray-based black-and-white scene according to an embodiment of this application.
Figure 4B:
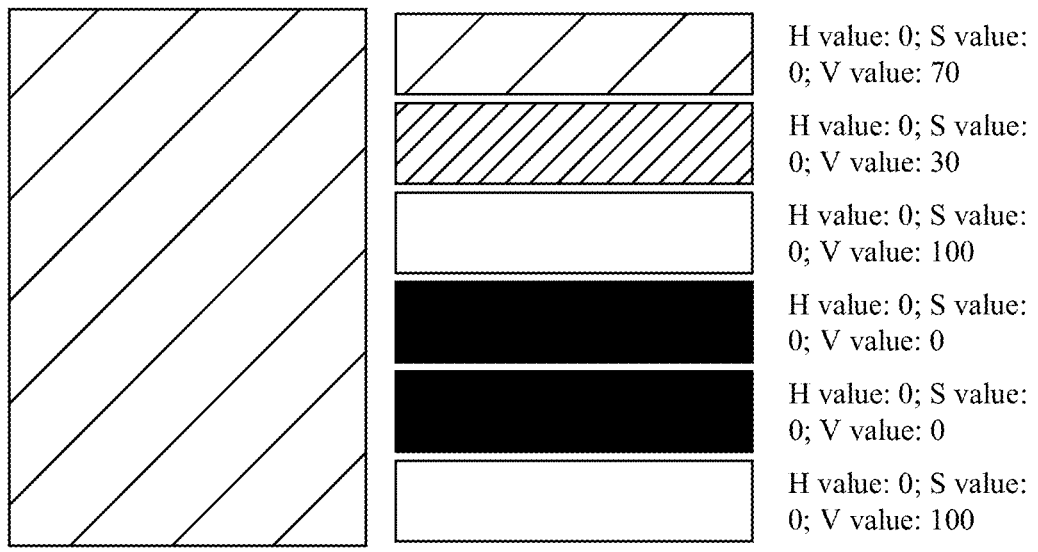
FIG. 4(b) is a schematic diagram of an HSV value of a color that can be presented by a control provided based on FIG. 4(a) according to an embodiment of this application.

A black-and-white scene shown in FIG. 4(a) is used as an example. FIG. 4(b) shows HSV values corresponding to colors in FIG. 4(a). Values of the dominant color, the dominant color shadow, the dominant color highlight, the auxiliary color, the auxiliary color shadow, and the auxiliary color highlight of the control that are determined based on the scene of the control region may be shown in Table 1.

TABLE 1

|  | H value | S value | V value |
|---|---|---|---|
| Dominant color | 0 | 0 | 70 |
| Dominant color shadow | 0 | 0 | 30 |
| Dominant color highlight | 0 | 0 | 100 |
| Auxiliary color | 0 | 0 | 0 |
| Auxiliary color shadow | 0 | 0 | 0 |
| Auxiliary color highlight | 0 | 0 | 100 |

Using the monochromatic color scene as an example, after Nh is sorted in descending order, an intermediate value of an interval corresponding to Nh (0) is selected, and an auxiliary color is determined based on a relationship between the intermediate value and a preset hue interval. When the intermediate value belongs to the preset hue interval, the auxiliary color of the control is set to black, or when the intermediate value does not belong to the preset hue interval, the auxiliary color of the control is set to white. In the embodiments of this application, the auxiliary color shadow is black, and the auxiliary color highlight is white.

An upper limit of the preset hue interval may be 195, and a lower limit may be 45. Certainly, the foregoing two parameters are not intended to limit the embodiments of this application, and may be adjusted by the user based on a color recognition capability of the user. A setting manner, a value of the upper limit, a value of the lower limit, and the like are not limited herein.

Figure 5A:
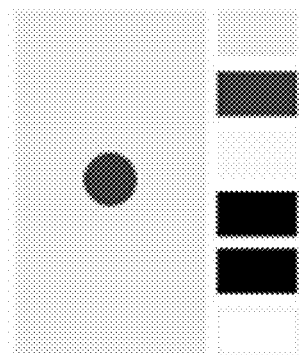
FIG. 5(a) is a schematic diagram a color that can be presented by a control provided based on a monochromatic color scene where a single color is yellow according to an embodiment of this application.
Figure 5B:
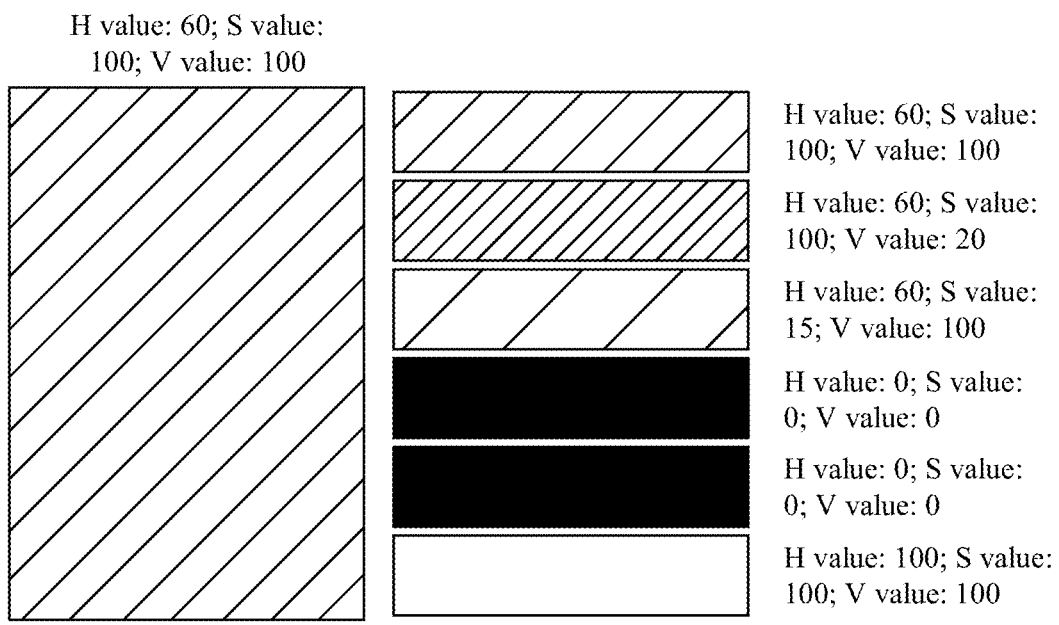
FIG. 5(b) is a schematic diagram of an HSV value of a color that can be presented by a control provided based on FIG. 5(a) according to an embodiment of this application.

A monochromatic color scene shown in FIG. 5(a) is used as an example, where the single color is yellow. FIG. 5(b) shows HSV values corresponding to colors in FIG. 5(a). The shown monochromatic color scene is used as an example. Values of the dominant color, the dominant color shadow, the dominant color highlight, the auxiliary color, the auxiliary color shadow, and the auxiliary color highlight of the control that are determined based on the scene of the control region may be shown in Table 2.

TABLE 2

|  | H value | S value | V value |
|---|---|---|---|
| Dominant color | 60 | 100 | 100 |
| Dominant color shadow | 60 | 100 | 20 |
| Dominant color highlight | 60 | 15 | 100 |
| Auxiliary color | 0 | 0 | 0 |
| Auxiliary color shadow | 0 | 0 | 0 |
| Auxiliary color highlight | 100 | 100 | 100 |

Figure 6A:
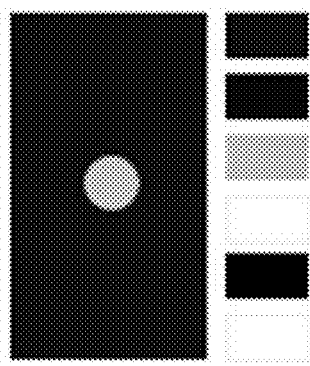
FIG. 6(a) is a schematic diagram of a color that can be presented by a control provided based on a monochromatic color scene where a single color is blue according to an embodiment of this application.
Figure 6B:
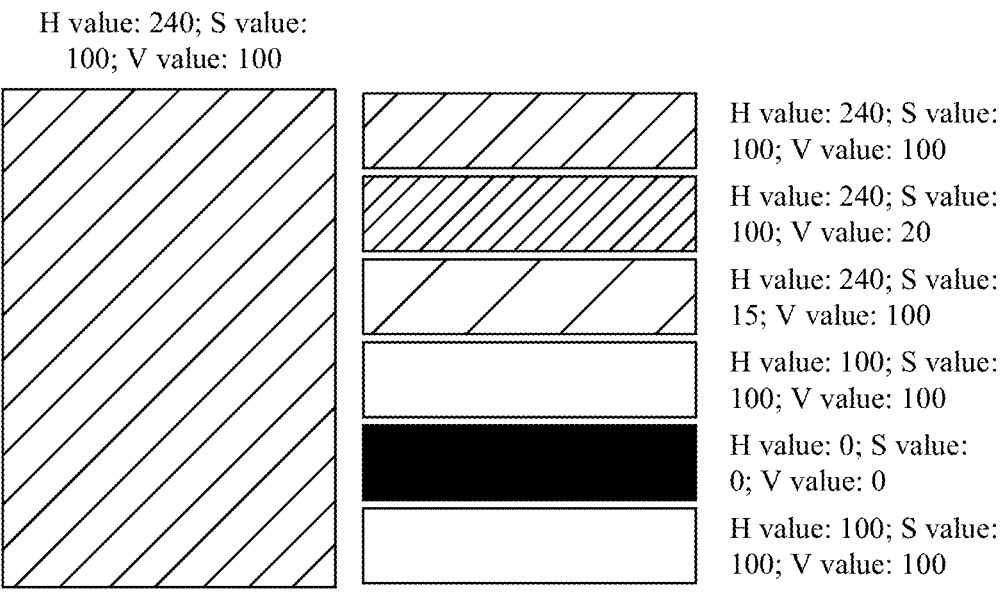
FIG. 6(b) is a schematic diagram of an HSV value of a color that can be presented by a control provided based on FIG. 6(a) according to an embodiment of this application.

A monochromatic color scene shown in FIG. 6(a) is used as an example, where the single color is blue. FIG. 6(b) shows HSV values corresponding to colors in FIG. 6(a). Values of the dominant color, the dominant color shadow, the dominant color highlight, the auxiliary color, the auxiliary color shadow, and the auxiliary color highlight of the control that are determined based on the scene of the control region may be shown in Table 3.

TABLE 3

|  | H value | S value | V value |
|---|---|---|---|
| Dominant color | 240 | 100 | 100 |
| Dominant color shadow | 240 | 100 | 20 |
| Dominant color highlight | 240 | 15 | 100 |
| Auxiliary color | 100 | 100 | 100 |
| Auxiliary color shadow | 0 | 0 | 0 |
| Auxiliary color highlight | 100 | 100 | 100 |

Figure 7:
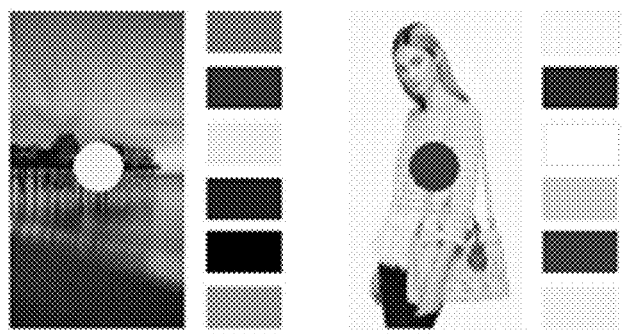
FIG. 7 is a schematic diagram of a color that can be presented by a control provided based on a color scene with a dominant color according to an embodiment of this application.

Using a color scene with a dominant color shown in FIG. 7 as an example, a dominant color shadow, a dominant color highlight, an auxiliary color shadow, and an auxiliary color highlight are derived based on a determined dominant color and a determined auxiliary color. It should be noted that, for the color scene with a dominant color, a manner of deriving the auxiliary color shadow and the auxiliary color highlight is the same as a manner of deriving the dominant color shadow and the dominant color highlight based on the dominant color. For details, refer to the foregoing content. Details are not described herein.

It can be learned that the mobile phone may use the derived dominant color shadow, dominant color highlight, auxiliary color shadow, and auxiliary color highlight to increase a three-dimensional effect for the control, provide more differentiated control information presentation, and further facilitate user interaction. For a specific presentation manner, refer to an implementation in the prior art. This is not limited herein.

It should be noted that, for a plurality of control regions, each of the plurality of control regions may be processed in the manner of processing the foregoing single control region. Details are not described herein.

According to the embodiments of this application, the display parameters of the control can be automatically determined, and content of the control can be clearly presented to the user. After the background picture is changed, the display parameters of the control can also be automatically adjusted as the background changes, so that a contrast between the content of the control and the background is always maintained, a clear interaction screen is provided for the user, and an operation is convenient for the user. In particular, for a user with low vision or color sensitivity, interaction convenience and interaction efficiency can be improved. This improves user experience and product competitiveness.

In the embodiments of this application, functional modules in the electronic device may be defined according to the foregoing method examples. For example, each functional module may be defined in a correspondence to each function, or two or more functions may be integrated in one processing module. The integrated module may be implemented in a form of hardware, or may be implemented in a form of a software functional module. It should be noted that, in this embodiment of this application, module division is an example, and is merely a logical function division. In actual implementation, another division manner may be used. The electronic device provided in this embodiment of this application is a device for implementing the foregoing method embodiment. For an unspecified part, refer to descriptions of the method embodiment.

Figure 8:
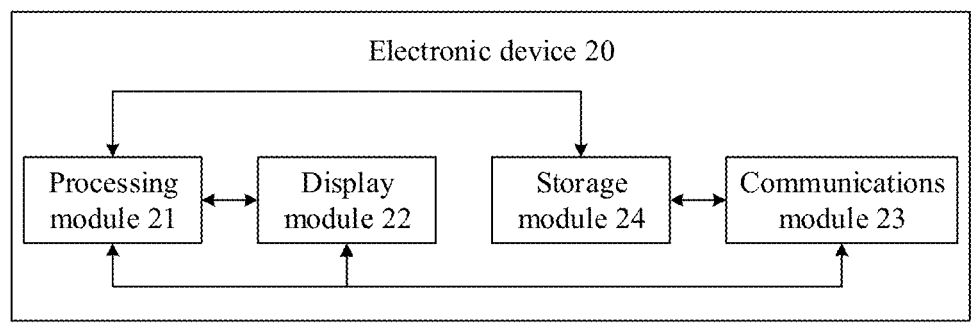
FIG. 8 is a schematic structural diagram of a second electronic device according to an embodiment of this application.

FIG. 8 is a possible schematic structural diagram of the electronic device in the foregoing embodiments. An electronic device 20 includes a processing module 21 and a display module 22. The processing module 21 is configured to support the electronic device 20 in determining a display position of a control on a background picture, and a display scene of the background picture at the display position of the control, where the display scene of the background picture at the display position of the control is determined based on display parameters of the background picture at the display position of the control; and determining display parameters of the control based on the display scene of the background picture at the display position of the control, so that a contrast between the background picture displayed at the display position of the control and the control displayed based on the display parameter meets a first preset condition. The display module 22 is configured to support the electronic device 20 in displaying the control based on the display parameters of the control determined by the processing module 21.

The processing module 21 is configured to determine the display scene of the background picture at the display position of the control. For determining of the display position of the control, refer to the foregoing method embodiment. One control may be used as a granularity, or partial display content of one control may be used as a granularity. Alternatively, at least one control may be used as a granularity, or some display content of one control and some or all of another or more controls are combined as a granularity. Details are not described herein.

For example, it is determined that the display scene is a black-and-white scene when a quantity of pixels, whose saturation values are less than a first threshold, in the background picture at the display position of the control is greater than a first quantity. It is determined that the display scene is a monochromatic color scene when the quantity of pixels, whose saturation values are less than the first threshold, in the background picture at the display position of the control is less than or equal to the first quantity, and a total quantity of pixels included in an interval with a largest quantity of pixels in a hue statistical histogram of the background picture at the display position of the control is greater than a second quantity. It is determined that the display scene is a color scene with a dominant color when the total quantity of pixels included in the interval with the largest quantity of pixels in the hue statistical histogram of the background picture at the display position of the control is greater than a third quantity. Alternatively, it is determined that the scene of the control region is a scene without a dominant color when the background picture at the display position of the control meets a second preset condition, where the second preset condition includes at least one of the following: the quantity of pixels, whose saturation values are less than the first threshold, in the background picture at the display position of the control is less than or equal to the first quantity; and the total quantity of pixels included in the interval with the largest quantity of pixels in the hue statistical histogram of the background picture at the display position of the control is less than or equal to the second quantity; and the total quantity of pixels included in the interval with the largest quantity of pixels in the hue statistical histogram of the background picture at the display position of the control is less than or equal to the third quantity.

In addition, the processing module 21 is further configured to determine a display effect of the control based on the display scene of the background picture at the display position of the control.

For example, when the scene is the black-and-white scene, it is determined that a saturation value of a dominant color of the control is 0, and a hue value of the dominant color of the control is any value within an available value range, where the available value range includes integers from 0 to 360; and when a maximum value of the background picture at the display position of the control is greater than a second threshold, it is determined that a value of the dominant color of the control is a difference between the maximum value and a third threshold; or when the maximum value of the background picture at the display position of the control is less than or equal to the second threshold, it is determined that the value of the dominant color of the control is 100.

For another example, when the scene is the monochromatic color scene or the color scene with a dominant color, it is determined that the hue value of the dominant color of the control is an average hue value of the interval with the largest quantity of pixels in the hue statistical histogram of the background picture at the display position of the control; it is determined that the saturation value of the dominant color of the control is an average saturation value in an interval with a largest quantity of pixels in a saturation statistical histogram of the background picture at the display position of the control; and when the maximum value of the background picture at the display position of the control is greater than the second threshold, it is determined that the value of the dominant color of the control is the difference between the maximum value value and the third threshold; or when the maximum value of the background picture at the display position of the control is less than or equal to the second threshold, it is determined that the value of the dominant color of the control is 100.

For another example, when the scene is the scene without a dominant color, it is determined that the saturation value of the dominant color of the control is 0, and the hue value of the dominant color of the control is any value in the available value range, where the available value range includes integers from 0 to 360; and when the maximum value of the background picture at the display position of the control is greater than the second threshold, it is determined that the value of the dominant color of the control is 0; or when the maximum value of the background picture at the display position of the control is less than or equal to the second threshold, it is determined that the value of the dominant color of the control is 100.

In an embodiment, the processing module 21 is further configured to determine a display effect of an auxiliary color based on a display effect of the dominant color of the control. For a specific determining manner, refer to the foregoing method embodiment. Details are not described herein. In addition, the processing module 21 is further configured to perform derivation based on the dominant color or the auxiliary color of the control, so that when the control is presented, a highlight, a shadow, and the like are displayed. Therefore, the control is clearly displayed and is more stereoscopic.

In an embodiment of this application, the electronic device 20 may further include a communications module 23 and a storage module 24. The communications module 23 is configured to support data exchange between the modules in the electronic device 20, and/or support communication between the electronic device 20 and another device such as a server. The storage module 24 is configured to support the electronic device 20 in storing program code and data of the electronic device.

The processing module 21 may be a processor or a controller, such as a central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The display module 22 may be implemented as a display. The communications module 23 may be implemented as a transceiver, a transceiver circuit, a communications interface, or the like. The storage module 24 may be implemented as a memory.

Figure 9:
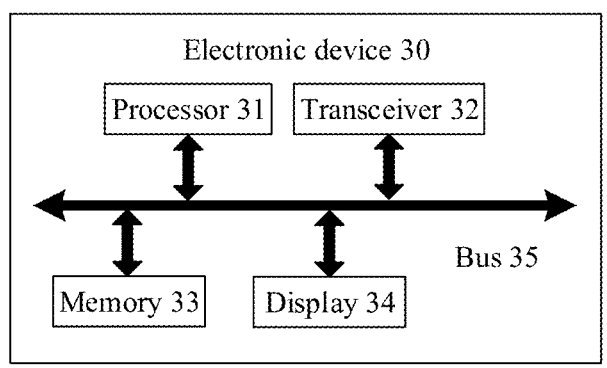
FIG. 9 is a schematic structural diagram of a third electronic device according to an embodiment of this application.

As shown in FIG. 9, an electronic device 30 includes a processor 31, a transceiver 32, a memory 33, a display 34, and a bus 35. The processor 31, the transceiver 32, the memory 33, and the display 34 may be connected to each other by using the bus 35. The bus 35 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be deployed in a same device, or the processor and the storage medium may be deployed in different devices as discrete components.

An embodiment of this application provides a readable storage medium. The readable storage medium stores an instruction. When the instruction runs on an electronic device, the electronic device is enabled to perform any one of the foregoing method embodiments.

An embodiment of this application provides a computer program product. The computer program product includes software code, and the software code is used to perform any one of the foregoing method embodiments.

An embodiment of this application provides a graphical user interface. The graphical user interface is configured to display a result of performing any one of the foregoing method embodiments.

A person skilled in the art should be aware that in the foregoing one or more examples, functions described in the embodiments of this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A control display method, comprising:
   determining a display region of a control;
   when a background picture at the display region of the control meets a second preset condition, determining that a display scene of the background picture at the display region of the control is a scene without a dominant color, wherein the second preset condition comprises a total quantity of pixels comprised in an interval with a largest quantity of pixels in a hue statistical histogram of the background picture at the display region of the control is less than or equal to a third quantity;
   when the display scene of the background picture at the display region of the control is the scene without the dominant color, determining that a saturation value of a dominant color of the control is 0, and a hue value of the dominant color of the control is any value in an available value range, wherein the available value range comprises integers from 0 to 360; and when a maximum value value of the background picture at the display region of the control is greater than a second threshold, determining that a value value of the dominant color of the control is 0; and displaying the control based on display parameters of the control, wherein the display parameters comprise the saturation value of the dominant color of the control, the hue value of the dominant color of the control and the value value of the dominant color of the control.

2. The method according to claim 1, wherein the display parameters of the control further comprise at least one of a dominant color shadow of the control and a dominant color highlight of the control.

3. An electronic device, comprising:

a processor, configured to determine a display region of a control;

when a background picture at the display region of the control meets a second preset condition, determining that a display scene of the background picture at the display region of the control a scene of a control region is a scene without a dominant color, wherein the second preset condition comprises a total quantity of pixels comprised in an interval with a largest quantity of pixels in a hue statistical histogram of the background picture at the display region of the control is less than or equal to a third quantity;

when the display scene of the background picture at the display region of the control is the scene without the dominant color, determining that a saturation value of a dominant color of the control is 0, and a hue value of the dominant color of the control is any value in an available value range, wherein the available value range comprises integers from 0 to 360; and when a maximum value value of the background picture at the display position of the control is greater than a second threshold, determining that a value value of the dominant color of the control is 0; and a display, configured to display the control based on display parameters of the control determined by the processor, wherein the display parameters comprise the saturation value of the dominant color of the control, the hue value of the dominant color of the control and the value value of the dominant color of the control.

4. A non-transitory computer readable storage medium storing an instruction, which when executed on an electronic device, cause the electronic device to perform operations, the operations comprising:

determining a display region of a control;

when a background picture at the display region of the control meets a second preset condition, determining that a display scene of the background picture at the display region of the control is a scene without a dominant color, wherein the second preset condition comprises a total quantity of pixels comprised in an interval with a largest quantity of pixels in a hue statistical histogram of the background picture at the display region of the control is less than or equal to a third quantity;

when the display scene of the background picture at the display region of the control is the scene without the dominant color, determining that a saturation value of a dominant color of the control is 0, and a hue value of the dominant color of the control is any value in an available value range, wherein the available value range comprises integers from 0 to 360; and when a maximum value value of the background picture at the display region of the control is greater than a second threshold, determining that a value value of the dominant color of the control is 0; and displaying the control based on display parameters of the control, wherein the display parameters comprise the saturation value of the dominant color of the control, the hue value of the dominant color of the control and the value value of the dominant color of the control.

5. The method according to claim 2, wherein a saturation value of the dominant color shadow of the control is the saturation value of the dominant color of the control plus 30, a value of the dominant color shadow of the control is 30, and a hue value of the dominant color shadow of the control is the same as the hue value of the dominant color of the control.

6. The method according to claim 2, wherein a saturation value of the dominant color highlight of the control is the saturation value of the dominant color of the control minus 30, and a value of the dominant color highlight of the control is 100, and a hue value of the dominant color highlight of the control is the same as the hue value of the dominant color of the control.

7. The electronic device according to 3, wherein the display parameters further comprise at least one of a dominant color shadow of the control and a dominant color highlight of the control.

8. The electronic device according to claim 7, wherein a saturation value of the dominant color shadow of the control is the saturation value of the dominant color of the control plus 30, a value of the dominant color shadow of the control is 30, and a hue value of the dominant color shadow of the control is the same as the hue value of the dominant color of the control.

9. The electronic device according to claim 7, wherein a saturation value of the dominant color highlight of the control is the saturation value of the dominant color of the control minus 30, and a value of the dominant color highlight of the control is 100, and a hue value of the dominant color highlight of the control is the same as the hue value of the dominant color of the control.

10. The non-transitory computer readable storage medium according to 4, wherein the display parameters further comprise at least one of a dominant color shadow of the control and a dominant color highlight of the control.

11. The non-transitory computer readable storage medium according to claim 10, wherein a saturation value of the dominant color shadow of the control is the saturation value of the dominant color of the control plus 30, a value of the dominant color shadow of the control is 30, and a hue value of the dominant color shadow of the control is the same as the hue value of the dominant color of the control.

12. The non-transitory computer readable storage medium according to claim 10, wherein a saturation value of the dominant color highlight of the control is the saturation value of the dominant color of the control minus 30, and a value of the dominant color highlight of the control is 100, and a hue value of the dominant color highlight of the control is the same as the hue value of the dominant color of the control.

* * * * *

UNITED STATES PATENT AND TRADEMARK OFFICE
CERTIFICATE OF CORRECTION

| | | |
|---|---|---|
| PATENT NO. | : 11,615,513 B2 | Page 1 of 1 |
| APPLICATION NO. | : 17/041984 | |
| DATED | : March 28, 2023 | |
| INVENTOR(S) | : Xuan Zhou, Chunliang Liu and Yubo Zhang | |

It is certified that error appears in the above-identified patent and that said Letters Patent is hereby corrected as shown below:

In the Claims

In Claim 3, Column 25, Line 18, delete "the control a scene of a control region is ascene without a dominant color," and insert --the control is a scene without a dominant color--.

Signed and Sealed this
Sixth Day of June, 2023

Katherine Kelly Vidal
*Director of the United States Patent and Trademark Office*